United States Patent Office 3,019,250
Patented Jan. 30, 1962

3,019,250
THIOPHOSPHORIC ACID ESTERS AND A PROCESS FOR THEIR PRODUCTION
Heinrich Kayser and Walter Lorenz, Wuppertal-Vohwinkel, and Gerhard Schrader, Wuppertal-Cronenberg, Germany, assignors to Farbenfabriken Bayer Aktiengesellschaft, Leverkusen, Germany, a corporation of Germany
No Drawing. Filed July 28, 1959, Ser. No. 829,992
Claims priority, application Germany Aug. 12, 1958
10 Claims. (Cl. 260—461)

The present invention relates to and has as its objects new and useful insecticidal compounds of the following formula

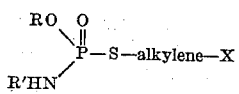

as well as a process for their production. In this formula R and R' stand for preferably low molecular weight alkyl radicals (having 1–4 carbon atoms) and X is an optional radical of an initially reactive haloalkyl. As such suitable reaction components Hal-alkyl-X there may be mentioned for example compounds in which X denotes —S-alkyl, —S-aryl, especially —S-phenyl, —NH-acyl, such as —NH-acetyl, —NH-propionyl, —NH—CO—CCl₃ and the like,

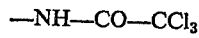

—CO—O—lower alkyl, e.g. —CO—OC₂H₅,

—CO—NH₂, —CO—NH-alkyl

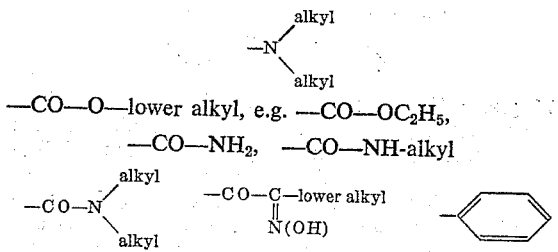

(possibly substituted by Cl, NCl₂, lower alkyl and the like) or nitrogen-containing heterocyclic ring systems, such as

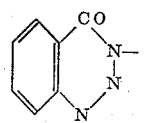

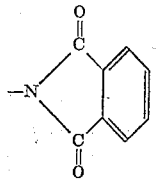

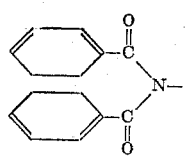

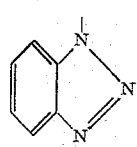

and the like. R' in the first formula in column 1 furthermore may stand for hydrogen.

It has been found that there valuable new insecticidal, particularly acaricidal agents are obtained by reacting alkali metal salts of the corresponding amido-alkyl-thionophosphoric acids with corresponding substituted haloalkyl compounds. These salts of amido-alkyl thionophosphoric acids react with the halo-alkyl compounds according to their thiol-form.

It is known that thionophosphoric acid-trialkyl esters are saponified by aqueous alkalis that one alkyl group is removed. By applying this process to the known dialkyl-thionophosphoric acid amides, one alkyl group is likewise eliminated and alkali metal salts of amido-alkyl thionophosphoric acid are obtained capable of reacting in the forms (a) and (b):

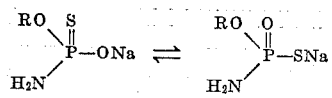

In this formulae R has the same significance as shown above. The latter form reacts with suitably substituted alkyl halides.

The condensation of the substituted amido-alkylthionophosphoric acid salts with the halo-compounds may be carried out in an aqueous solution or also in the presence of a suitable inert solvent. Some of the new esters thus obtained are water-insoluble liquids which are not distillable even under high vacuum. In some other cases there are also obtained distillable materials or solid crystalline compounds.

The esters for application for pesticidal purpose may be mixed in known manner with wetting or dispersing agents. These mixtures may then be brought with water into a readily dispersible form. In this form or also as powders in combination with suitable solid extenders such as talc, chalk or the like, the new compounds may be used as plant protecting agents or for pest control.

Some of the esters are distillable under vacuum without decomposition. They distinguish themselves by an outstanding insecticidal action. They may be used in the same manner as other known phosphoric insecticides, i.e. in a concentration from about 0.00001% to about 1%, diluted or extended with suitable solid or liquid carriers or diluents. Examples of such solid carriers are talc, chalk, bentonite, clay and the like, as liquid carriers there may be mentioned, water (if necessary with commercial emulsifiers), alcohols, especially lower alcohols such as methanol or ethanol, ketones, especially lower ketones such as acetone or methyl ethyl ketone, liquid hydrocarbons and the like. The new compounds may furthermore be used in combination with each other or with known insecticides, fertilizers etc.

As an example for the special utility of the inventive compounds the compounds of the following formulae (I) 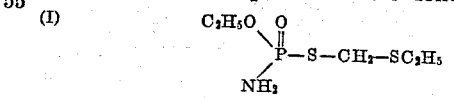

(II) 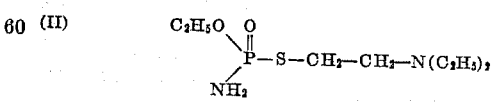

(III) 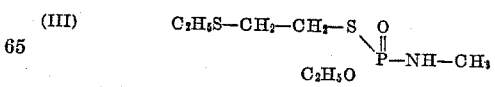

have been tested against spider mites. Aqueous solutions of the aforementioned compounds have been prepared by admixing them with the same amount of an auxiliary solvent (acetone). A commercial emulsifier (benzyl hydroxy diphenyl polyglycol ether) is added in an amount of 20% referred to active ingredient. This premixture then is diluted with water to the desired concentration.

The test has been carried out as follows: against spider mites (contact-insecticidal action). Bean plants (*phaseolus vulgaris*) of about 15 inches height are sprayed drip wet with solutions as prepared above. The bean plants have been infested heavily with the two-spotted spider (species *Tetranchus telarius*). Evaluation has been carried out after 24 hours, 48 hours and 8 days. The total percentage of killed pests after 8 days is to be seen from the following table:

| Compound | Aqueous concentration (in percent active ingredient/water) | Killing rate (in percent) |
|---|---|---|
| (I) | 0.01 | 100 |
| (II) | 0.01 | 100 |
| (III) | 0.001 | 100 |

The following examples are given for the purpose of illustrating the present invention, without, however, limiting it thereto.

*Example 1*

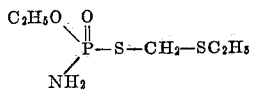

To 68 grams (0.15 mol) of amido-ethyl thiolphosphoric acid barium salt in 250 cc. of methyl ethyl ketone there are added dropwise with stirring at 35–45° C. 40 grams (0.3 mol) of α-chloro-methyl-ethyl-sulfide dissolved in 50 cc of methyl ethyl ketone. The mixture is kept at 45° C. for ½ hour and the temperature then raised to 75° C. for a further 30 minutes. The precipitated barium chloride is filtered off. The solvent is removed from the filtrate by evaporation. The residue is taken up with chloroform, washed with 30 cc. of water and then dried over sodium sulfate. After distilling off the solvent, the residue is kept under a vacuum of 0.01 mm. Hg at a bath temperature of 60° C. for one hour. The oil thus obtained can be clarified with a little kieselguhr. 46 grams of the new ester are thus obtained as a pale yellow water-insoluble oil. Yield: 71% of the theoretical.

On rats per os the new ester shows a mean toxicity of 5 mg./kg. Aphids and spider mites are killed completely with 0.01% solutions. The compound has an excellent ovicidal effect on the ovae of the red spider. Eating insects such as caterpillars are likewise completely killed with 0.1% solutions.

*Example 2*

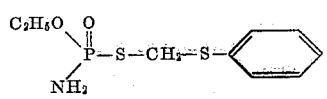

85 grams (0.5 mol) of amido-diethyl-thiophosphate (B.P. 99–102° C./3 mm. Hg) are saponified in usual manner with the theoretically required amount of sodium hydroxide solution. To the solution thus obtained there are added with stirring 79 grams (0.5 mol) of α-chloromethyl-phenyl-sulfide. The mixture is heated to 90–95° C. for about 5 hours and then allowed to cool. The reaction product is shaken out twice with 200 cc.-portions of chloroform. The chloroform extract thus obtained is washed with water and then dried over sodium sulfate. The solvent is then evaporated under vacuum. The soft residue thus obtained is taken up with a small amount of chloroform, and petroleum ether is carefully added. 48 grams of the new ester are thus obtained as colorless crystals of M.P. 52–54° C. Yield: 37% of the theoretical.

On rats per os the new ester shows a mean toxicity of 10 mg./kg. Aphids and spider mites are completely killed with 0.01% solutions. At a concentration of 0.1% the preparation shows a total systemic action. Caterpillars are likewise completely killed with 0.1% solutions.

*Example 3*

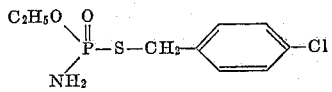

85 grams (0.5 mol) of amido-diethyl-thiophosphate are dissolved in 250 cc. of ethanol and saponified in usual manner with the requisite amount of sodium hydroxide solution. To the solution thus obtained there are added 80 grams (0.5 mol) of p-chlorobenzyl chloride. The mixture is heated to about 80° C. for a further 5 hours and then allowed to cool. The reaction product is shaken out twice with 200 cc.-portions of chloroform. The chloroform extract thus obtained is washed with water and dried over sodium sulfate. Upon evaporation of the solvent, the new ester is obtained as a crystalline product. The crystals are taken up with benzene and carefully precipitated with petroleum ether. 87 grams of the new ester are thus obtained in a crystalline form. M.P. 85° C. Yield: 66% of the theoretical.

On rats per os the ester shows a $LD_{95}$ of 25 mg./kg. Spider mites are completely killed with 0.01% solutions. The compound has an outstanding ovicidal activity against the ovae of the red spider. Caterpillars are likewise killed completely with 0.1% solutions.

*Example 4*

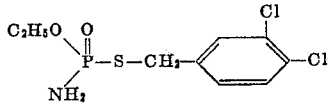

76 grams (0.45 mol) of amido-diethyl-thiophosphate are dissolved in 230 cc. of ethanol and saponified with the requisite amount of sodium hydroxide solution. Subsequently, 88 grams of 3.4-dichlorobenzyl chloride dissolved in 50 cc. of ethanol are added to the solution. The mixture is heated to about 80° C. for another 4 hours and then allowed to cool. The reaction product separates into two layers. The aqueous layer is separated and extracted twice with 100 cc.-portions of chloroform. The chloroform extract is combined with the oily phase. The mixture is dried over sodium sulfate and the solvent evaporated under vacuum. The solid residue is taken up with carbon tetrachloride and precipitated by the careful addition of petroleum ether. 97 grams of the new ester are thus obtained as colorless crystals of M.P. 64° C. Yield: 72% of the theoretical.

On rats per os the ester shows a means toxicity of 25 mg./kg. Spider mites are completely killed with 0.1% solutions. The preparation has an excellent ovicidal action on the eggs of the red spider.

*Example 5*

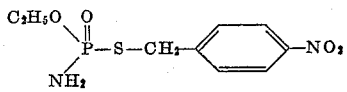

60 grams (0.3 mol) of amido-ethyl-thiolphosphoric acid sodium salt and 51 grams (0.3 mol) of 4-nitro-benzyl chloride are dissolved in 300 cc. of acetonitrile. The mixture is heated with stirring to 50° C. The reaction is exothermic. The mixture is then heated to 70–80° C. for 15 minutes and the hot sodium chloride formed filtered off with suction. The crystalline residue thus obtained may be re-crystallized from benzene. 76 grams of the new ester of M.P. 97–98° C. are thus obtained. Yield: 92% of the theoretical.

On rats per os the new ester shows a mean toxicity of 5 mg./kg.

*Example 6*

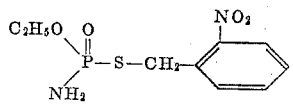

Under similar conditions as in the preceding example 73 grams of the new ester are obtained from 60 grams (0.3 mol) of amido-ethyl-thiolphosphoric acid sodium salt and 51 grams (0.3 mol) of 2-nitro-benzyl chloride. Yield: 88% of the theoretical. M.P. after re-crystallization from benzene: 90–91° C.

On rats per os the new ester shows a mean toxicity of 5 mg./kg.

*Example 7*

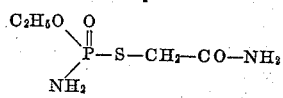

60 grams (0.3 mol) of amido-ethyl-thiolphosphoric acid sodium salt and 28 grams (0.3 mol) of chloro-acetamide are dissolved in 300 cc. of methyl ethyl ketone. The mixture is heated to 60° C. for 2 hours and the temperature is then raised to 70–80° C. for a further 30 minutes. The sodium chloride formed is filtered off with suction and the filtrate concentrated by evaporation under vacuum. The residue thus obtained is re-crystallized twice from ethyl alcohol. 47 grams of the new ester are thus obtained as a colorless crystalline substance of M.P. 134° C. Yield: 79% of the theoretical.

On rats per os the new ester shows a mean toxicity of 10 mg./kg.

*Example 8*

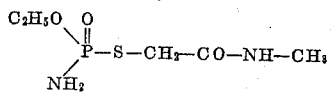

In a similar manner there are obtained from 60 grams (0.3 mol) of amido-ethyl-thiolphosphoric acid sodium salt and 33 grams (0.3 mol) of monochloro-acetic acid methyl-amide 36 grams of the new ester as a crystalline substance of M.P. 89–90° C. Yield: 57% of the theoretical.

Mean toxicity on rats per os 5 mg./kg.

*Example 9*

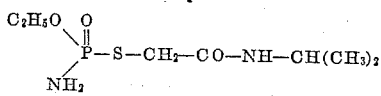

Under similar conditions there are obtained from 60 grams (0.3 mol) of amido-ethyl-thiolphosphoric acid sodium salt and 42 grams (0.3 mol) of chloro-acetic acid isopropylamide 54 grams of the new ester as a water-insoluble yellow oil. Yield: 75% of the theoretical.

Mean toxicity on rats per os 10 mg./kg.

*Example 10*

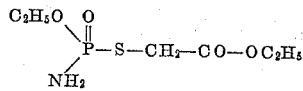

Under similar conditions there are obtained from 60 grams (0.3 mol) of amido-ethyl-thiolphosphoric acid sodium salt and 37 grams (0.3 mol) of chloro-acetic acid ethyl ether 39 grams of the new ester of M.P. 36° C. (after re-crystallization from chloroform/petroleum ether). Yield: 57% of the theoretical.

*Example 11*

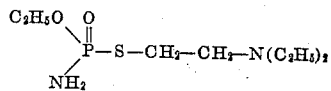

To 68 grams (0.15 mol) of amido-ethyl-thiolphosphoric acid barium salt in 250 cc. of methyl ethyl ketone there are added with stirring at 40° C. 42 grams of β-diethylamino-ethyl chloride dissolved in 50 cc. of methyl ethyl ketone. The mixture is then heated to 70–80° C. for another 2–3 hours. After cooling, the barium chloride formed is separated. The solvent is evaporated under vacuum. The residue is taken up with chloroform, washed with water and dried over sodium sulfate. After distilling off the chloroform, the residue thus obtained is kept under a vacuum of 0.05 mm. Hg at a bath temperature of 70° C. for a short time. 53 grams of the new ester are thus obtained as a viscous liquid. The new ester is soluble in plenty of water. Yield: 74% of the theoeretical.

Aphids and spider mites are safely killed with 0.01% solutions. 0.1% solutions completely kill caterpillars. At a concentration of 0.1% the preparation has a marked systemic action.

*Example 12*

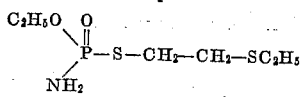

68 grams (0.15 mol) of amido-ethyl-thiolphosphoric acid barium salt are dissolved in 200 cc. of ethyl methyl ketone. 43.5 grams (0.35 mol) of β-ethylmercapto-ethyl chloride are then added. The mixture is kept with stirring at 70–80° C. for 2 hours. After cooling, the barium chloride formed is filtered off with suction. The solvent is evaporated down under vacuum. The viscous oily residue thus obtained is clarified with kieselguhr. 52 grams of the new ester are thus obtained as a water-insoluble oil. Yield: 76% of the theoretical.

On rats per os the mean toxicity is 5 mg./kg. Aphids and spider mites are still completely killed with 0.01% solutions. Caterpillars are likewise killed completely with 0.1% concentrations.

*Example 13*

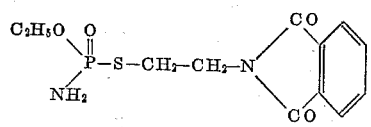

40 grams (0.2 mol) of amido-ethyl-thiolphosphoric acid sodium salt and 51 grams (0.2 mol) of β-bromo-ethyl-phthalimide are dissolved in 200 cc. of acetonitrile. The mixture is heated to 70–80° C. with stirring for 5 hours. The sodium bromide thus formed is then filtered off with suction. The solvent is evaporated down in the filtrate under vacuum. By carefully adding petroleum ether to the residue 39 grams of the new ester are obtained as a colorless crystalline substance of M.P. 124–126° C. Yield 64% of the theoretical.

*Example 14*

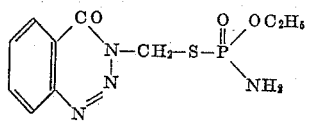

To a suspension of 30 grams (0.18 mol) of amido-ethyl-thiolphosphoric acid sodium salt in 150 cc. of acetone there are added 36 grams (0.15 mol) of N-bromo-methylbenzazimide. After stirring at room temperature for an hour the reaction is completed by heating to 50–60° C. for another 2 hours. After cooling, the precipitated sodium bromide is filtered off with suction and the solvent is distilled off under vacuum. The residual oil solidifies upon the addition of water. From a little isopropylalcohol the ester is obtained as ivory-colored small needles of M.P. 118° C. Yield: 25 grams (62.5% of the theoretical).

On rats per os $LD_{95}$ 10 mg./kg.

Calculated: N=18.66%; S=10.68%; P=10.31%.
Found: N=18.50%; S=10.25%; P=9.93%.

Example 15

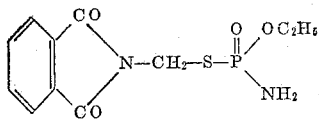

48 grams (0.2 mol) of N-bromo-methylphthalimide are dissolved in 300 cc. of acetonitrile and treated with 38 grams (0.21 mol) of amido-ethyl-thiolphosphoric acid sodium salt. After stirring at 60–70° C. for 2 hours, the mixture is allowed to cool, the sodium bromide is filtered off with suction and the solvent distilled off under vacuum. The residue solidifies and is re-crystallized from ethyl acetate. Colorless short small needles of M.P. 151–152° C. Yield: 50 grams i.e. 83% of the theoretical.

Example 16

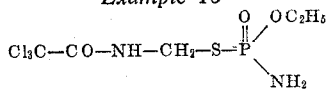

To a solution of 92 grams (0.5 mol) of amido-ethyl-thiolphosphoric acid sodium salt in 200 cc. of acetone there is added dropwise a solution of 88 grams (0.42 mol) of trichloro-acetamido-chloromethane in 50 cc. of acetonitrile. Sodium chloride precipitates with a weakly exothermic reaction. After heating to 70° C. for an hour, the mixture is allowed to cool and water is added. The product is neutralized with sodium carbonate solution and the methylene-bis-trichloro-acetamide (M.P. 195° C.) formed as a by-product filtered off. The oil contained in the filtrate is taken up with ether, washed and dried. After distilling off the solvent, the ester is obtained as a thickly liquid lemon-yellow oil which is not distillable. Yield: 20 grams, i.e. 15% of the theoretical.

Example 17

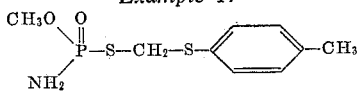

20 grams of sodium hydroxide (0.5 mol) are dissolved in 200 cc. of methanol. 70 grams of amido-dimethyl-thionophosphate (B.P. 78° C./1 mm. Hg) are added with stirring at 30–35° C. The mixture is stirred at this temperature for 12 hours. To the clear solution thus obtained at 50° C. there are added 88 grams (0.5 mol) of 4-methylphenyl-α-chloromethyl ether (B.P. 90° C./1 mm. Hg). The reaction mixture is stirred at 50° C. for an hour and then diluted with 300 cc. of benzene and well shaken. The benzene solution is separated washed twice with 50 cc.-portions of water and then dried over sodium sulfate. The solvent is removed under vacuum. 98 grams of the new ester are thus obtained as a pale yellow viscous oil. The ester is sparingly water-soluble. Yield: 73% of the theoretical. On rats per os the ester shows a mean toxicity of 250 mg./kg.

Example 18

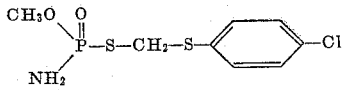

Under similar conditions as in Example 17, 95 grams of the new ester are obtained from 97 grams (0.5 mol) of 4-chlorophenyl-α-chloromethyl-thioether (B.P. 91° C./1 mm. Hg). The ester is a pale yellow water-insoluble oil. Yield: 65% of the theoretical. On rats per os the ester shows a mean toxicity of 100 mg./kg.

Example 19

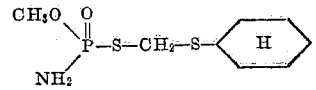

When working as described in Example 17 with the use of 85 grams (0.5 mol) of α-chloromethyl-cyclohexyl-thio- ether (B.P. 65° C./1 mm. Hg), 100 grams of the new ester are obtained. After re-crystallization from petroleum ether, the new ester is obtained as colorless needles of M.P. 56° C. Yield: 77% of the theoretical. On rats per os the new ester shows a mean toxicity of 50 mg./kg.

Example 20

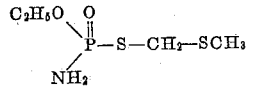

90 grams (0.55 mol) of amido-ethyl-thiolphosphoric acid sodium salt are dissolved in 300 cc. of acetonitrile. 48.3 grams (0.5 mol) of α-chloro-dimethylsulfide (B.P. 50° C./110 mm. Hg; Journ. Am. Chem. Soc., 77 [1955], page 576) are added dropwise starting at 20° C. The temperature slowly rises to 35–40° C. To complete the reaction the mixture is stirred first at room temperaure for an hour and finally at 70° C. for a further 3 hours. The sodium chloride is filtered off with suction and the solvent distilled off under vacuum. The residue after distillation is dissolved in twice its amount of water, the solution is rendered neutral to Congo and shaken out several times with methylene chloride. After drying over sodium sulfate the solvent is distilled off. 75 grams of a pale yellowish water-soluble oil are thus obtained which is not distillable. Yield: 74.7% of the theoretical. On rats per os the ester shows a mean toxicity of 5–10 mg./kg.

Example 21

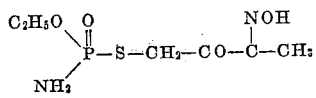

Into a solution of 46 grams (0.28 mol) of amido-ethyl-thiolphosphoric acid sodium salt in 100 cc. of water there are slowly introduced at 20° C. 45 grams (0.25 mol) of 1-bromo-2.3-butanedione-3-oxime (M.P. 86–87° C.). The temperature rises to 30° C. and at the same time an oil separates out. The product is heated at 30–40° C. for a further hour. The oil is taken up with benzene, washed with a sodium bicarbonate solution and water dried over sodium sulfate and the solvent is distilled off. The residue after distillation solidifies on cooling and is re-crystallized from methylene chloride. Colorless crystals of M.P. 81–82° C. Yield: 50 grams, i.e. 84.8% of the theoretical. On rats per os mean toxicity 100 mg./kg.

Example 22

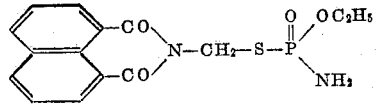

43 grams (0.15 mol) of N-bromo-methylnaphthalimide (M.P. 244–246° C.) and 37 grams (0.2 mol) of amido-ethylthiolphosphoric acid sodium salt are suspended in 150 cc. of acetonitrile. After the addition of 10 cc. of water, the mixture is stirred at room temperature for an hour and, finally, at 70° C. for 3 hours. After cooling the crystals are filtered off with suction and washed with water. By recrystallization from 300 cc. of n-propanol, crude pale yellow crystals of M.P. 159–161° C. are obtained. Yield: 45.5 grams, i.e. 86.8% of the theoretical. On rats per os the ester has a mean toxicity of 1000 mg./kg.

Example 23

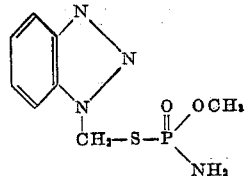

30 grams (0.2 mol) of amido-methyl-thiolphosphoric acid sodium salt (M.P. 58° C.) and 32 grams (0.15 mol) of N-bromo-methyl-benztriazole are stirred in 250 cc. of acetonitrile at 50–60° C. for an hour. After cooling, the sodium bromide is filtered off with suction. The solvent is distilled off under vacuum and the residual oil taken up with methylene chloride. After working up in the manner repeatedly described and drying over calcium chloride, there are obtained 21 grams of a thickly liquid yellow oil which solidifies very slowly. Yield: 54.3% of the theoretical. On rats per os the $LD_{95}$ is 25 mg./kg.

*Example 24*

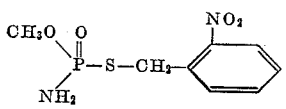

57 grams (0.4 mol) of amido-dimethyl-thionophosphate are dissolved with 16 grams of sodium hydroxide in 10 cc. of water and 60 cc. of methanol and stirred at room temperature for 12 hours. 68 grams (0.4 mol) of 2-nitro-benzyl chloride are then added. The mixture is futher stirred at room temperature for an hour and then briefly heated to 60–70° C. 500 cc. of water are then added. The sparingly water-soluble ester thus formed separates out in a crystalline form. The crude product is re-crystallized from a mixture of benzene and isopropyl-alcohol. 83 grams of the new ester are thus obtained as colorless crystals of M.P. 93° C. Yield: 79% of the theoretical. On rats per os the $LD_{95}$ is 10 mg./kg.

*Example 25*

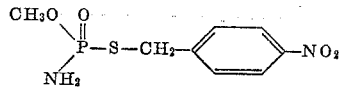

43.3 grams (0.3 mol) of amido-dimethyl-thionophosphate are saponified as described in Example 24. To the saponification product there are added with stirring at room temperature 51 grams (0.3 mol) of 4-nitro-benzyl chloride dissolved in 300 cc. of methyl ethyl ketone. The mixture is stirred at room temperature for 12 hours and then heated to 60° C. for about 1 hour. The reaction product is then poured into 2 litres of water. The new ester then separates out in a solid form. After recrystallization from 300 cc. of isopropyl-alcohol, 51 grams of the new ester of M.P. 129–130° C. are obtained. Yield: 71% of the theoretical. The mean toxicity on rats per os is 5 mg./kg.

*Example 26*

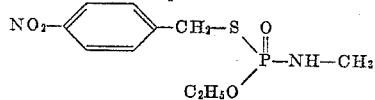

57.9 grams (0.3 mol) of methyl-amido-ethyl-thiolphosphoric acid potassium are dissolved in just the necessary amount of ethanol/water to give solution, whereafter while stirring there are introduced at room temperature 51 grams (0.3 mol) of p-nitroso-benzyl chloride. Stirring is continued for 12 hours at room temperature and then for 30 minutes at 70° C. After cooling the mixture is poured into 300 ml. of water and the oil which separates is taken up in chloroform (100 ml.). The chloroformic solution is washed neutral with water and dried over sodium sulfate. After evaporating the solvent the crude product crystallizes. After recrystallization of benzene it melts at 80–82° C. There are obtained 63 grams of the new ester, i.e. 72% of the theoretical. $LD_{50}$ on rats per os 5 mg./kg. Spider mites are killed completely with 0.01% solutions.

*Example 27*

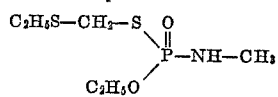

57.9 grams of methyl-amido-ethyl-thiolphosphoric acid potassium are dissolved in just the necessary amount of water/ethanol and there are added into this solution while stirring at room temperature 35 grams of α-chloromethyl-ethyl-sulfide. Stirring is continued at room temperature for about 12 hours and working up is carried out as described in the foregoing example. There are obtained 40 grams of the new ester distilling at B.P. 0.05 mm. 145° C. Yield: 58% of the theoretical. $LD_{50}$ on rats per os 5 mg./kg.

0.01% solutions completely kill aphids, spider mites and caterpillars.

*Example 28*

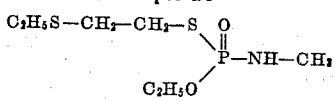

57.9 grams of methyl-amido-ethyl-thiolphosphoric acid potassium are dissolved in just the necessary amount of water/ethanol and there are added into this solution while stirring 38 grams of α-chloro-ethyl-ethyl-sulfide. Stirring is continued for 12 hours at room temperature and working up is carried out as described in the foregoing examples. These are obtained 45 grams of the new ester distilling at 95–100° C. Yield: 62% of the theoretical. On rats per os $LD_{50}$ 50 mg./kg.

Spider mites are killed completely with 0.001% solutions. At the same concentration the compound has ovicidal action with eggs of red spider.

*Example 29*

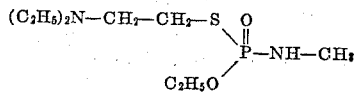

57.9 grams of methyl-amido-ethyl-thiolphosphoric acid potassium are dissolved in just the necessary amount of ethanol/water and while stirring there are added at room temperature 41 grams of 2-chloroethyl-diethyl amine. Stirring is continued at room temperature and the mixture is worked up as described before. There are obtained 51 grams of the above shown ester as a viscous slightly water-soluble compound which is not distillable even in high vacuum without decomposition. Yield 67% of the theoretical. On rats per os $LD_{50}$ 2.5 mg./kg.

Spider mites are killed completely with 0.01% solutions. At the same concentration the compound has an ovicidal action with eggs of red spiders.

We claim:

1. The compound of the following formula

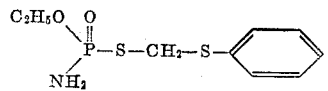

2. The compound of the following formula

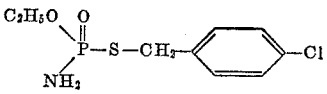

3. The compound of the following formula

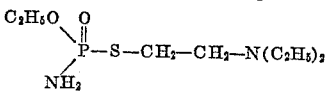

4. The compound of the following formua

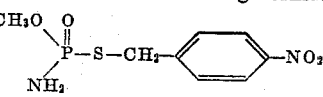

5. The compound of the following formula

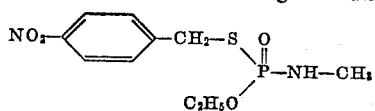

6. The compound of the following formula

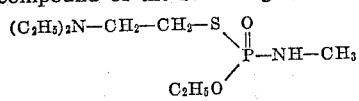

7. A thiophosphoric acid ester of the following general formula

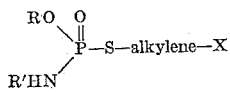

wherein R' stands for a member selected from the group consisting of hydrogen and a lower alkyl radical having up to 4 carbon atoms, R stands for a lower alkyl radical having up to 4 carbon atoms, alkylene stands for a lower alkylene radical having up to 4 carbon atoms, and X stands for a member selected from the group consisting of S-lower alkyl, and S-phenyl radical, N-di-lower alkyl, carbo-lower alkoxy, amino-carbonyl, a phenyl radical, benztriazolmethylene, a benzazimide radical, a phthalic acid imide radical, a naphtholic acid imide radical and a benzotriazol radical.

8. A thiophosphoric acid ester of the following formula

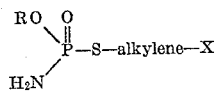

wherein R stands for a lower alkyl radical having up to 4 carbon atoms, alkylene stands for a lower alkylene radical having up to 4 carbon atoms, and X stands for a member selected from the group consisting of S-lower alkyl, an S-phenyl radical, N-di-lower alkyl, carbo-lower alkoxy, amino-carbonyl, a phenyl radical, benztriazol-methylene, a benzazimide radical, a phthalic acid imide radical, a naphtholic acid imide radical and a benzotriazol radical.

9. A thiophosphoric acid ester of the following formula

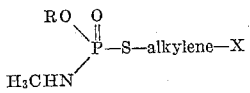

wherein R stands for a lower alkyl radical having up to 4 carbon atoms, alkylene stands for a lower alkylene radical having up to 4 carbon atoms, and X stands for a member selected from the group consisting of S-lower alkyl, an S-phenyl radical, N-di-lower alkyl, carbo-lower alkoxy, amino-carbonyl, a phenyl radical, benztriazol-methylene, a benzazimide radical, a phthalic acid imide radical, a naphtholic acid imide radical and a benzotriazol radical.

10. A compound of the following formula

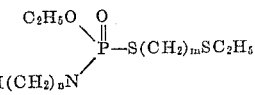

wherein $n$ is a whole number from 0 through 1 and $m$ is a whole number from one through 2.

References Cited in the file of this patent
UNITED STATES PATENTS 2,881,201    Schrader ---------------- Apr. 7, 1959

FOREIGN PATENTS 1,032,247    Germany ---------------- June 19, 1958